(12) United States Patent
Nikolaus et al.

(10) Patent No.: US 12,504,337 B2
(45) Date of Patent: Dec. 23, 2025

(54) METHOD FOR DETERMINING A FUNCTION CRITERION OF A MEASURING TRANSDUCER OF A MOTOR VEHICLE

(71) Applicant: Volkswagen Aktiengesellschaft, Wolfsburg (DE)

(72) Inventors: Norbert Nikolaus, Vordorf (DE); Michael Truee, Magdeburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 18/116,659

(22) Filed: Mar. 2, 2023

(65) Prior Publication Data
US 2023/0280217 A1 Sep. 7, 2023

(30) Foreign Application Priority Data
Mar. 3, 2022 (DE) .......................... 10 2022 105 077

(51) Int. Cl.
*G01K 15/00* (2006.01)
(52) U.S. Cl.
CPC .................................. *G01K 15/007* (2013.01)
(58) Field of Classification Search
CPC ................................................... G01K 15/007
See application file for complete search history.

(56) References Cited

U.S. PATENT DOCUMENTS

| | | | | |
|---|---|---|---|---|
| 5,715,178 A | * | 2/1998 | Scarola | G21C 17/00 702/116 |
| 6,234,399 B1 | * | 5/2001 | Leu | G01M 15/048 236/94 |
| 6,598,195 B1 | * | 7/2003 | Adibhatla | G01D 3/08 714/25 |
| 7,555,411 B2 | | 6/2009 | Wang et al. | |
| 9,008,891 B2 | | 4/2015 | Houle et al. | |
| 2002/0193921 A1 | * | 12/2002 | Reese, II | F01P 11/16 701/1 |

(Continued)

FOREIGN PATENT DOCUMENTS

| | | |
|---|---|---|
| DE | 10341454 A1 | 5/2004 |
| DE | 102008006732 A1 | 10/2008 |

(Continued)

*Primary Examiner* — Kurt Philip Liethen
(74) *Attorney, Agent, or Firm* — Muncy, Geissler, Olds & Lowe, P.C.

(57) ABSTRACT

A method for determining a function criterion of a measuring transducer of a motor vehicle, comprising: determining, with the aid of preconditions, whether a predefined vehicle state of the motor vehicle is present; capturing measured values of at least three measuring transducers which measure the same measured variable; calculating a measure of central tendency from the captured measured values; calculating a comparison value from the captured measured value with respect to the calculated measure of central tendency; ascertaining the function criterion of the measuring transducer, based on a comparison of the calculated comparison value with a threshold value, the capture of the measured values being carried out within a time period after the initialization of the controller, the ascertained function criterion being determined if the preconditions have been met and the provided vehicle state is thus present.

11 Claims, 6 Drawing Sheets

(56) References Cited

U.S. PATENT DOCUMENTS

| | | | |
|---|---|---|---|
| 2003/0076233 A1* | 4/2003 | Sato | H02M 7/00 340/584 |
| 2004/0129065 A1* | 7/2004 | Plote | F02D 41/222 60/276 |
| 2004/0195500 A1* | 10/2004 | Sachs | G16B 40/10 250/282 |
| 2005/0178130 A1* | 8/2005 | Van Gilder | F01P 11/16 374/E15.001 |
| 2006/0137436 A1* | 6/2006 | Buck | F02D 41/222 73/114.61 |
| 2009/0003405 A1* | 1/2009 | Corbet | G01K 15/007 374/1 |
| 2013/0076381 A1* | 3/2013 | Takayanagi | G01K 3/005 374/1 |
| 2016/0273975 A1* | 9/2016 | Tano | G01K 15/007 |

FOREIGN PATENT DOCUMENTS

| | | |
|---|---|---|
| DE | 102013219049 A1 | 4/2014 |
| GB | 2513249 A | 10/2014 |

* cited by examiner

METHOD FOR DETERMINING A FUNCTION CRITERION OF A MEASURING TRANSDUCER OF A MOTOR VEHICLE

This nonprovisional application claims priority under 35 U.S.C. § 119(a) to German Patent Application No. 10 2022 105 077.7, which was filed in Germany on Mar. 3, 2022, and which is herein incorporated by reference.

BACKGROUND OF THE INVENTION

Field of the Invention

The invention relates to a method for determining a function criterion of a measuring transducer of a motor vehicle. Measuring transducers are used in motor vehicles for different purposes. Measuring transducers of this type and methods for determining a function criterion are also applicable to other vehicle concepts or other drive concepts (e.g., electric, hybrid, fuel cell drives, alternative fuels).

Description of the Background Art

Measuring transducers and sensors supply measured variables, which may be used to monitor and set operating states. A temperature sensor is used, for example, to set the combustion within a prime mover designed as an internal combustion engine. Based on a detection of the temperature of the sucked-in air and a temperature of the exhaust gases, it is possible, for example, to ascertain a mixing ratio of exhaust gas and air for an exhaust gas recirculation system.

Setting the combustion within a prime mover designed as an internal combustion engine may result in lower fine material and nitrogen oxide values in the exhaust gas. To meet ever stricter exhaust gas guidelines, the temperature sensors used to set the combustion must therefore function properly. This requires a determination of a function criterion of a temperature sensor of this type.

In other vehicle and/or drive concepts, temperature sensors may be used to monitor and set coolant circuits, controllers, or energy stores, for example batteries or hydrogen tanks of the particular prime mover and fuel cells.

A check must also be made of whether the determination of a function criterion has taken place in a vehicle state provided for this purpose. In the case of temperature sensors, this may be a multiplicity of cold start conditions.

In the event that the measuring transducers comprise pressure sensors which measure, for example, an absolute pressure, a relative pressure, or both, one purpose is to measure the flow of fluids through components of the motor vehicle. For example, this is done via the pressure drop in the flow through the component. Fluids comprise coolant, intake air, and exhaust gases. A boost pressure following a turbocharger or a compressor may also influence the combustion within the internal combustion engine and thus also the fine material and nitrogen oxide values in the exhaust gas.

In other vehicle and/or drive concepts, pressure sensors may be used to monitor and set coolant circuits, controllers, or energy stores, for example batteries or hydrogen tanks of the particular prime mover and fuel cells.

A check must also be made of whether the determination of a function criterion has taken place in a vehicle state provided for this purpose. For pressure sensors, this may comprise, for example, a check of whether the internal combustion engine or pumps in the motor vehicle have been running at the point in time of the determination of the function criterion.

Methods are known, in which the measured values of the relevant measuring transducers, which measure the same measured values are cross-compared with each other, and a counter counts the number and instances of a measuring transducer exceeding the threshold value during this cross-comparison. A measuring transducer is considered to be defective if its counter exceeds a maximum number. This has the disadvantage that many comparisons must be carried out. In addition, these comparisons must be carried out with relatively high threshold values, so that environmental influences which generate a gradient of the measured variable in the motor vehicle, as well as the tolerances of the individual measuring transducers which measure the same measured variables, do not result in misdiagnoses.

SUMMARY OF THE INVENTION

It is therefore an object of the present invention to provide a method for determining a function criterion of a measuring transducer of a motor vehicle, which at least partially overcomes the disadvantages mentioned above.

This object is achieved by a method according to an exemplary embodiment of the invention for determining a function criterion of a measuring transducer of a motor vehicle. The object is also achieved by a controller including a control unit, which is configured to carry out a method for determining a function criterion of a measuring transducer in an internal combustion engine. The object is further achieved by an internal combustion engine, which comprises a controller of this type. The object is also achieved by a motor vehicle including an internal combustion engine of this type.

A method according to the invention for determining a function criterion of a measuring transducer of a motor vehicle comprises: determining, with the aid of preconditions, whether a predefined vehicle state of the motor vehicle is present; capturing measured values of at least three measuring transducers which measure the same measured variable; calculating a measure of central tendency from the captured measured values; calculating a comparison value from a captured measured value with respect to the calculated measure of central tendency; ascertaining the function criterion of the measuring transducer, based on a comparison of the calculated comparison value with a threshold value, the capture of the measured values being carried out within a time period after the initialization of the controller of a prime mover, the ascertained function criterion being determined if the preconditions have been met and the predefined vehicle state is thus present.

For example, the measuring transducer can be a temperature sensor, the predefined vehicle state can be a cold start, the preconditions can be cold start conditions, and the prime mover can be an internal combustion engine.

A cold start is important for the comparison of the measured values of the at least three temperature sensors, since the temperature sensors are exposed to different operating temperatures in their installation positions during the operation of the motor vehicle. The cold start is intended to ensure that the temperatures at the installation positions correspond to the ambient temperature as much as possible and are thus comparable with each other.

It may be determined whether a cold start is present on the basis of different conditions, the cold start conditions. A cold start condition may be, for example, a minimum time value which must be exceeded by the shutdown phase so that a cold start may be present. A further cold start condition may be, for example, a detection of an engine block heater (also referred to as a block heater), so that the engine block of the internal combustion engine should not be preheated in order for a cold start to be present. This may corrupt the comparison of temperature sensors near the engine block with temperature sensors at a distance from the engine block.

A further cold start condition may be, for example, the detection of incident sunlight, which may heat the motor vehicle from above and within the interior, and temperature sensors installed higher up or closer to the interior heat up more than do temperature sensors installed close to the underbody of the motor vehicle. For example, the incident sunlight may therefore not exceed a specified intensity over a specific period of time in order for a cold start to be present.

A further cold start condition may be, for example, the detection of an auxiliary heater. This has a similar effect to that of the engine block heater, only that temperature sensors installed closer to the interior heat up more than do temperature sensors installed at a greater distance from the interior. This may corrupt the comparison of temperature sensors near the interior at a distance from the interior. The auxiliary heater should therefore not have preheated the interior in order for a cold start to be present.

A further cold start condition may be, for example, a maximum time which a controller of an internal combustion engine should not exceed prior to the start of the internal combustion engine in order for a cold start to be present. The controller may heat up relatively quickly after the startup of the controller. If a temperature sensor installed on the controller is used in the method according to the invention, a comparability of this temperature sensor with other temperature sensors may be ensured by the maximum time. A combination of cold start conditions may be employed to check the presence of a cold start and grant a function enable for the method for determining a function criterion of a temperature sensor of a motor vehicle.

Measured values of at least three temperature sensors are captured for calculating the measure of central tendency. This makes it possible to minimize the influence of an outlier which is measured, for example, by a defective temperature sensor. The median of two measured values is, for example, sensitive to outliers of this type and would not permit conclusions as to which of the temperature sensor is defective. The median of three measured values, however, may estimate an ambient temperature with a high degree of reliability, as long as no more than one of the three temperature sensors is defective and measures the outlier. Measures of central tendency, such as a trimmed mean value or trimmed arithmetic mean, require at least three measured values to be able to decide which of the measured values is an outlier and needs to be eliminated if only one of the measured values is an outlier. For a determination of a "not okay" function criterion of two or more defective temperature sensors, measured values of more than three sensors must be captured.

A measure of central tendency is calculated from the measured values to obtain a central tendency from the distribution of the measured values. This measure of central tendency best reflects the ambient temperature during a cold start. It is advantageous if the measure of central tendency is insensitive to outlying measured values, since defective temperature sensors are most likely to be detected if they measure measured values situated at the edge of the distribution of the measured values.

Calculating a measure of central tendency makes it possible to compare the measured values of all participating temperature sensors against the measure of central tendency. This reduces the number of comparisons carried out, since not all measured values need to be compared at least once against all other measured values, but this must be done only once against the measure of central tendency.

A comparison value with the measure of central tendency is therefore calculated for each measured value. The comparison value may be, for example, a difference of the measured value and the measure of central tendency. However, the comparison value may also be a quotient of the two.

Threshold values can be predefined for each comparison value. For determining an "okay" function criterion, the comparison value must be less than an upper threshold value and greater than a lower (negative) threshold value. As a result, a measured value should not deviate too far upwardly or downwardly from the measure of central tendency, so that an "okay" function criterion is determined for the temperature sensor which has measured the measured value.

If the comparison value is greater than an upper threshold value or less than a lower threshold value, a "not okay" function criterion may be determined. The fact that a "not okay" function criterion is determined thus follows for the measured values if the measured values deviate to a greater degree from the measure of central tendency upwardly or downwardly than is permitted by the particular threshold value.

In the event that the measure of central tendency of a lower threshold value is outside the measurement range of the temperature sensor, the method for determining a function criterion of this temperature sensor, to which the threshold value is assigned, may be aborted. The same is true for a measure of central tendency plus an upper threshold value.

Due to the insensitivity of the measure of central tendency to outlying measured values and the general error tolerance of the individual measured values, threshold values may be predefined for each comparison value which permit smaller deviations of the measured values than is the case with the direct comparison of the measured values of the temperature sensors.

The temperature sensors can be selected either from a group of air-side temperature sensors, a group of engine block and coolant temperature sensors, or a group of exhaust-side temperature sensors.

Further groups of temperature sensors may also be used. The increasing networking of motor vehicles with each other and with mobile devices, control methods, such as gesture control and driver assistance systems, provide a reason to install additional electronic components, for example displays, cameras, and further controllers. These components and their controllers may also contain temperature sensors and be grouped, for example, into a group of electronics as well as used in the method for determining a function criterion of a temperature sensor of a motor vehicle.

The air-side temperature sensors can be, in part, arranged in the air induction system of the internal combustion engine. However, temperature sensors are also classified herein, which are not expected to deviate greatly from the ambient temperature, for example fuel temperature sensors and temperature sensors for electronic components. Temperature sensors which may be arranged in electronic components of the motor vehicle may furthermore form an independent group and are grouped independently of the air-side temperature sensors.

The group of engine block and coolant temperature sensors can be installed on the engine block or in the coolant circuit, while the exhaust-gas-side temperature sensors are installed in the exhaust tract and measure the temperatures of exhaust gases and components which come into contact with exhaust gases. Temperature sensors on drive components or engines and in coolant circuits of other drive types may also be included. Other drive types comprise, for example, hydrogen combustion drives, fuel cell drives, and electric drives. These may be installed individually or in combination with each other or with an internal combustion engine.

The air-side temperature sensors are expected to quickly measure measured values during cooling, which adapt to the ambient temperature. Temperature sensors of the engine block and coolant circuit may be expected to be influenced by the heat storage capacity of the coolant and the engine block during heating and cooling. The exhaust-side temperature sensors heat up quickly by the hot exhaust gases after the startup of the internal combustion engine.

The time period after the start command for starting the internal combustion engine can have a time delay for air-side temperature sensors and for a group of engine block and coolant temperature sensors, which differs from the time delay of the exhaust-side temperature sensors.

Due to the faster heating of the exhaust gas temperatures, the exhaust-side temperature sensors must be measured earlier, while, in the case of the air-side temperature sensors, ambient air is sucked in, and the group of engine block and coolant temperature sensors has not yet undergone a significant heating by the heat capacity of the coolant and the engine block or the oil.

The threshold value can be assigned to a pair of threshold values, which are arranged symmetrically upwardly and downwardly around the measure of central tendency.

The threshold value can be assigned to a pair of threshold values, which are arranged asymmetrically upwardly and downwardly around the measure of central tendency.

The threshold values may be arranged asymmetrically for each temperature sensor by calculating a measure of central tendency from the measured values and calculating a comparison value between the measure of central tendency and a measured value. This means that the distance between a lower threshold value and the measure of central tendency does not have to be equal to the distance from an upper threshold value and the measure of central tendency.

The measure of central tendency can be a median from the measured values of the at least three temperature sensors.

The median has the advantage that it always sorts the measured values and selects the middle measured values. This makes the median insensitive to outliers. The determination of a function criterion of a temperature sensor of a motor vehicle may be carried out with the aid of at least three measured values from each of three temperature sensors.

The measure of central tendency can be an arithmetic mean from the measured values of at least three temperature sensors, the measured value of the at least three temperature sensors which has the greatest deviation from the other measured values, and is therefore an outlier, being eliminated from the arithmetic mean. This is a so-called trimmed mean value. If one of the measured values is an outlier and may be reliably eliminated, the measured values of three temperature sensors may be sufficient. If the outlier may not be reliably eliminated, the use of the measured values of four or more temperature sensors improves the reliability.

At least four temperature sensors may be used to eliminate an outlier from the set of measured values.

A controller including a control unit can be configured to carry out a method for determining a function criterion of a temperature sensor of a motor vehicle according to the above embodiments.

An internal combustion engine including a controller according to the above example is able to carry out a method for determining a function criterion of a temperature sensor of a motor vehicle according to the above embodiments.

A motor vehicle including an internal combustion engine according to the above embodiment is able to carry out a method for determining a function criterion of a temperature sensor of a motor vehicle according to the above embodiments.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
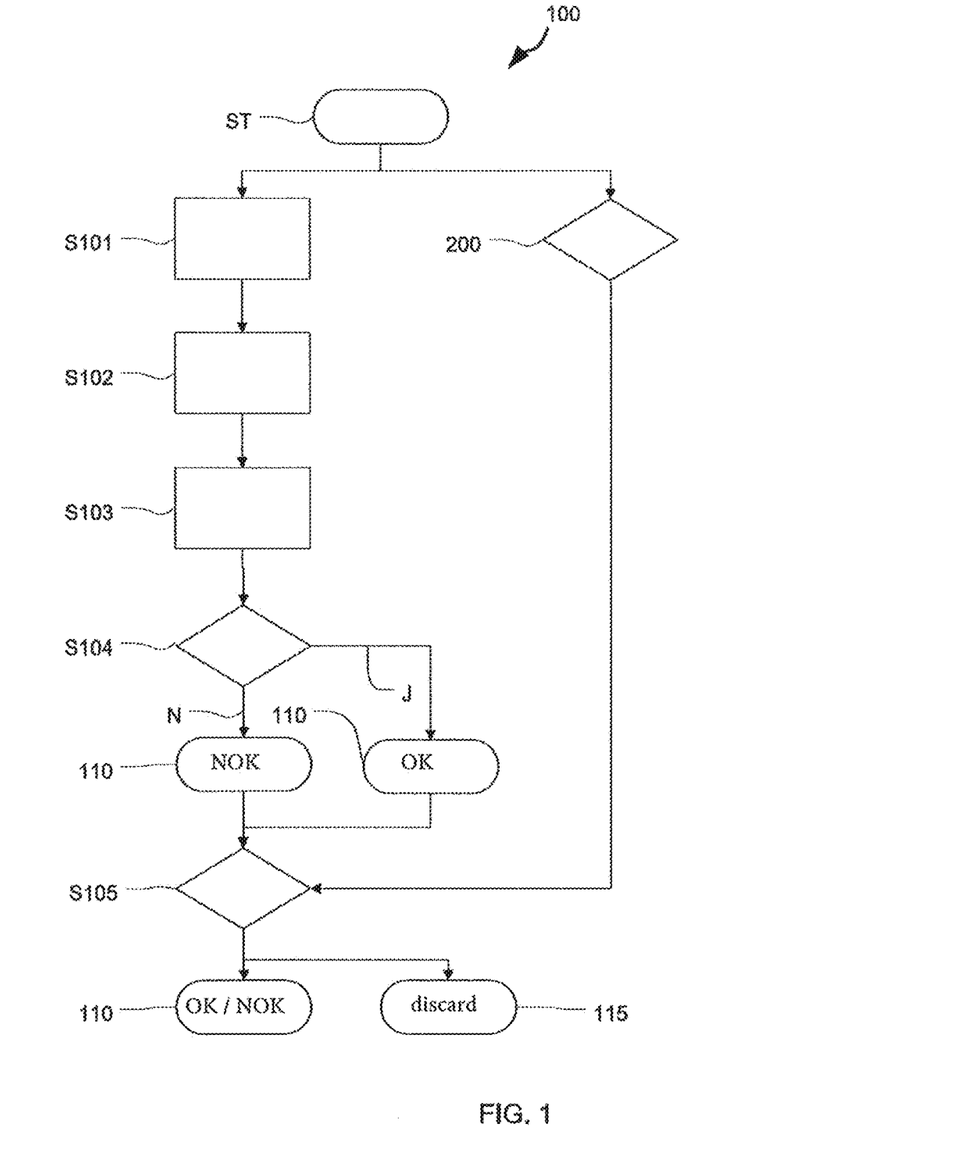
FIG. 1 is a schematic representation of an exemplary embodiment of a method for determining a function criterion of a temperature sensor of a motor vehicle.

FIG. 1 is a schematic representation of an exemplary embodiment of a method for determining a function criterion of a temperature sensor of a motor vehicle.

Figure 2:
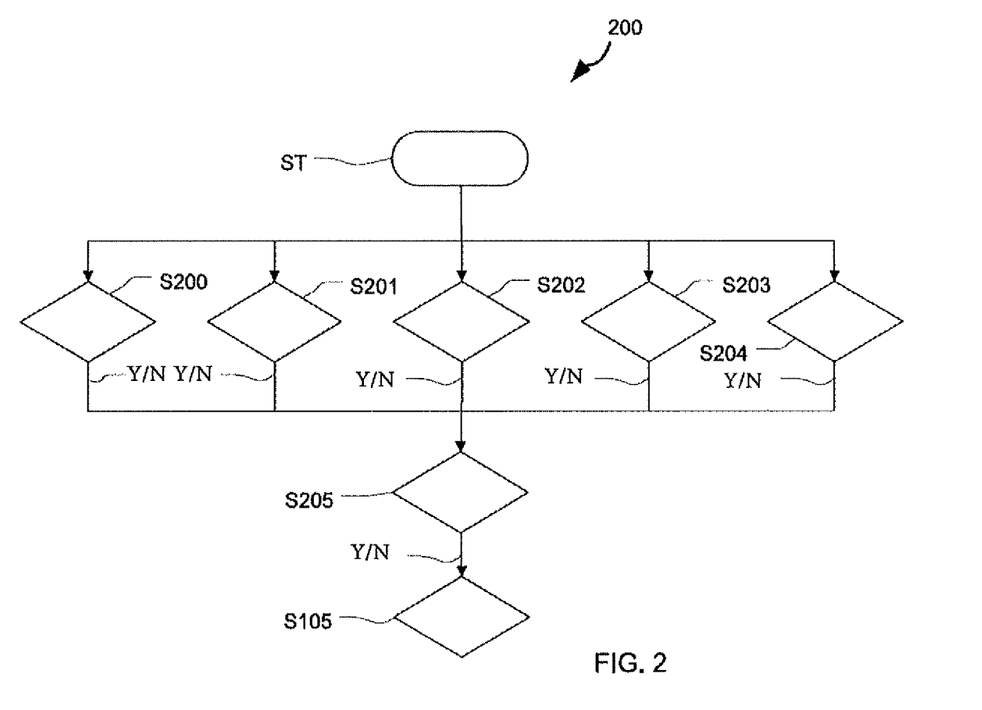
FIG. 2 is a schematic representation of an exemplary embodiment of a method for determining whether a cold start is present, as applicable in FIG. 1.

Method 100 begins with the initialization (ST) of controller (305 in FIGS. 3 and 6) of the prime mover (601 in FIG. 6) designed as an internal combustion engine. In decision step 200, a check is made of whether the cold start conditions have been met. One exemplary embodiment of such a check of the cold start conditions is illustrated in FIG. 2. The result of whether the cold start conditions have been met Y/N is transmitted to step S105. The determination of whether the cold start conditions have been met is carried out in parallel with steps S101 through S104. This is due to the fact that some cold start conditions, for example the detection of incident sunlight or a block heater (both in FIG. 2) require more time than, for example, steps S101 through S104.

Measured values of at least three temperature sensors are captured in step S101. The capture of the measured values takes place after start command ST for starting the internal combustion engine and may thus occur before or shortly after the startup of the internal combustion engine. One measured value is the measured value of the temperature sensor whose function criterion is being determined, and the at least two further measured values are the measured values of two further temperature sensors installed in the motor vehicle (600 in FIG. 6). After the measured values have been captured, the method continues with step S102.

A measure of central tendency (407 in FIGS. 4*a* and 4*b*; 507 in FIG. 5) of the distribution of the measured values captured in step S101 is calculated in step S102. Such a measure of central tendency may be, for example, a median or a trimmed arithmetic mean.

After the measure of central tendency has been calculated, the method continues in step S103 with the calculation of a comparison value from a measured value and the calculated measure of central tendency. The measured value used for this purpose is the measured value of the temperature sensor whose function criterion is being determined. The comparison value may be the difference between the measured value and the measure of central tendency. However, the comparison value may also be a quotient from the measured value and the measure of central tendency.

After the comparison value has been calculated, a comparison of the comparison value with a threshold value (for example, 408, 409 in FIG. 4*a*; 408', 409' in FIG. 4*b*; 508, 509 in FIG. 5) is carried out in step S104. It may be determined whether the comparison value is greater than a threshold value which is not to be exceeded by the comparison value. It may furthermore be determined whether the comparison value is less than a threshold value which is not to be dropped below by the comparison value. A determination of whether the comparison value is within an acceptance range spanned by threshold values is possible by comparing the comparison value with two threshold values, of which a lower threshold value is not to be dropped below and an upper threshold value is not to be exceeded. The threshold values may be a pair of threshold values arranged symmetrically around the measure of central tendency. However, the threshold values may also be a pair of threshold values arranged asymmetrically around the measure of central tendency.

If a comparison value in the comparisons is greater than a threshold value which is not to be exceeded by the comparison value, or less than a threshold value which the comparison value is not to drop below N, a "not okay" (NOK) function criterion 110 is ascertained. However, if a comparison value in the comparisons is less than a threshold value which is not to be exceeded by the comparison value, or greater than a threshold value which the comparison value is not to drop below Y, an "Okay" (OK) function criterion 110 is ascertained.

At this point, the function criteria are ascertained and not determined, since the query as to whether the cold start conditions have or have not been met has not yet been incorporated. The cold start conditions ensure that the capture of the function criterion was carried out under predefined conditions and whether the result may thus be trusted. This corresponds to a subsequent function enable.

The result as to whether the cold start conditions have or have not been met Y/N is used for decision step S105. If the cold start conditions have not been met N, a function criterion 110 may not be determined on the basis of the comparisons, and method 100 ends in that ascertained function criterion 110 (either "okay" or "not okay") is discarded 115. However, if the cold start conditions have been met Y, a function criterion 110 may be determined on the basis of the comparisons, and method 100 ends with the determination of determined function criterion 110. Determined function criterion 110 is forwarded.

FIG. 2 is a schematic representation of an exemplary embodiment of a method for determining whether a cold start is present, as applicable in FIG. 1.

Method 200 begins with the initialization (ST) of controller (305 in FIGS. 3 and 6) of prime mover (601 in FIG. 6) designed as an internal combustion engine. Steps S200 through S204 may be carried out independently of each other after start command ST. Steps S200 through S204 may be carried out or begin after start command ST and thus shortly before or shortly after the startup of the internal combustion engine. Some of the steps require more time to determine the particular cold start criterion. Steps S200 through S204 are thus carried out in method 200 as parallel steps.

In step S200, a check is made of whether the shutdown phase of the internal combustion engine has exceeded a predetermined time value, for example 27000 s. Step S200 transmits whether the predetermined time value was exceeded by the shutdown phase Y/N. If the shutdown phase has not exceeded the predetermined time value, the fact that this cold start condition has not been met N is transmitted. However, if the shutdown phase has exceeded the predetermined time value, the fact that this cold start condition has been met Y is transmitted.

In step S201, a check is made of whether an engine block heater (also referred to as "block heater") is installed and ensures that the internal combustion engine was not preheated. Step S201 transmits whether the engine block was preheated Y/N. If the internal combustion engine was preheated by an engine block heater, the fact that this cold start condition has not been met N is transmitted. However, if the internal combustion engine was not preheated by an engine block heater, the fact that this cold start condition has been met Y is transmitted.

In step S202, a check is made of whether incident sunlight on the motor vehicle (600 in FIG. 6) has occurred, for example during the time period of the shutdown or shortly before the startup of the internal combustion engine, which exceeds, for example, a predetermined intensity value in a predefined length of the time period. Temperature sensors near the upper side and in the interior of the motor vehicle may heat up more thereby than other temperature sensors. Step S202 transmits whether incident sunlight of this type has occurred Y/N. If incident sunlight of this type has occurred, the fact that this cold start condition was not met N is transmitted. However, if incident sunlight of this type has not occurred, the fact that this cold start condition was met Y is transmitted.

In step S203, a check is made of whether an auxiliary heater has preheated the motor vehicle, for example the interior. Step S203 transmits whether an auxiliary heater has preheated the motor vehicle Y/N. If an auxiliary heater has preheated parts of the motor vehicle, the fact that this cold start condition has not been met N is transmitted. However, if an auxiliary heater has not preheated the motor vehicle, the fact that this cold start condition has been met Y is transmitted.

In step S204, a check is made of whether a maximum time after a startup of a controller of the internal combustion engine has been exceeded. Step S204, transmits whether a maximum time after a startup of a controller of the internal combustion engine has been exceeded Y/N. If the maximum time has been exceeded, the fact that this cold start condition has not been met N is transmitted. However, if the maximum time has not been exceeded, the fact that this cold start condition has been met Y is transmitted.

In step S205, it is considered whether the cold start conditions from Steps S200 through S204 have been met. Step S205 transmits, for example, whether all cold start conditions have been met Y/N and a cold start is thus present. If one of the cold start conditions has not been met, the fact that no cold start is present N is transmitted. If all cold start conditions have been met, the fact that a cold start is present Y is transmitted, and the function enable for the method to determine a function criterion of a temperature sensor of a motor vehicle takes place. The result of whether a cold start is present Y/N is transmitted to decision step S105 (also in FIG. 1).

Figure 3:
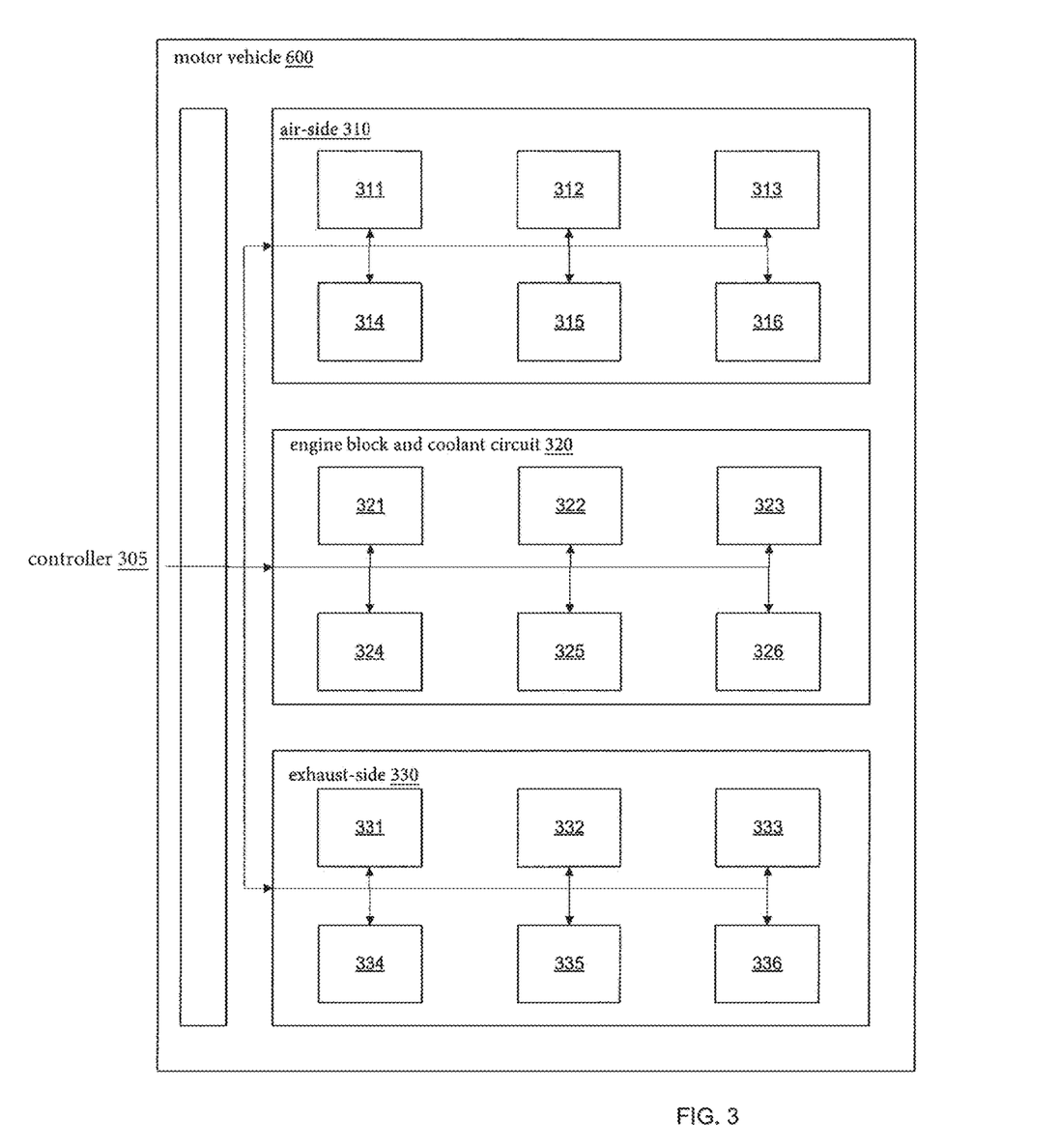
FIG. 3 is a schematic representation of an exemplary embodiment of a motor vehicle, including a controller and temperature sensors.

FIG. 3 is a schematic representation of an exemplary embodiment of a motor vehicle, including a controller and temperature sensors.

The temperature sensors of motor vehicle 600 are grouped into multiple groups, air-side 310, engine block and coolant circuit 320, and exhaust-side 330. A further group may also be given, which contains temperature sensors installed in electrical components. Controller 305 is connected to each of the temperature sensors and captures measured values of the temperature sensors.

Air-side 310 temperature sensors are situated, in part, in the induction system of the internal combustion engine or in regions which are most likely to adapt them to the ambient temperature of the air. Air-side 301 temperature sensors include, for example, a gas temperature sensor 311 upstream from a charge air cooler, a gas temperature sensor 312 downstream from the charge air cooler, an ambient temperature sensor 313, a fuel temperature sensor 314, an engine controller temperature sensor 315, and a gas temperature sensor 316 in the fresh air induction system.

Engine block and coolant circuit temperature sensors 320 are situated on the engine block or in the coolant circuit. Engine block and coolant circuit temperature sensors 320 include, for example, a coolant temperature sensor 321 at the engine outlet, a coolant temperature sensor 322 at the cooler outlet, a coolant temperature sensor 333 upstream from the high-pressure exhaust gas recirculation cooler, a coolant temperature sensor 334 upstream from the charge air cooler, an oil temperature sensor 335, and a coolant temperature sensor 336 upstream from the low-pressure exhaust gas recirculation cooler.

Temperature sensors on drive components or motors and in coolant circuits of other drive types may furthermore be included. Other drive types comprise, for example, hydrogen combustion drives, fuel cell drives, and electric drives. These may be installed individually or in combination with each other or with an internal combustion engine.

The exhaust-side 330 temperature sensors are situated in the exhaust tract and measure the exhaust gas temperature or the temperature of components which come into contact with the exhaust gas. The exhaust-side 330 temperature sensors include, for example, an exhaust gas temperature sensor 331 upstream from the turbine, an exhaust gas temperature sensor 332 upstream from the diesel oxidation catalyst (DOC), an exhaust gas temperature sensor 333 downstream from the DOC, an exhaust gas temperature sensor 334 downstream from the diesel particulate filter (DPF), an exhaust gas temperature sensor 335 downstream from the high-pressure exhaust gas recirculation cooler, and an exhaust gas temperature sensor 336 downstream from the low-pressure exhaust gas recirculation cooler.

The air-side 310 temperature sensors are expected to quickly measure measured values during cooling, which adapt to the ambient temperature. Temperature sensors of engine block and coolant circuit 320 may be expected to be influenced by the heat storage capacity of the coolant and the engine block during heating and cooling. The exhaust-side 330 temperature sensors heat up quickly by the hot exhaust gases after the startup of the internal combustion engine.

Figure 4A:
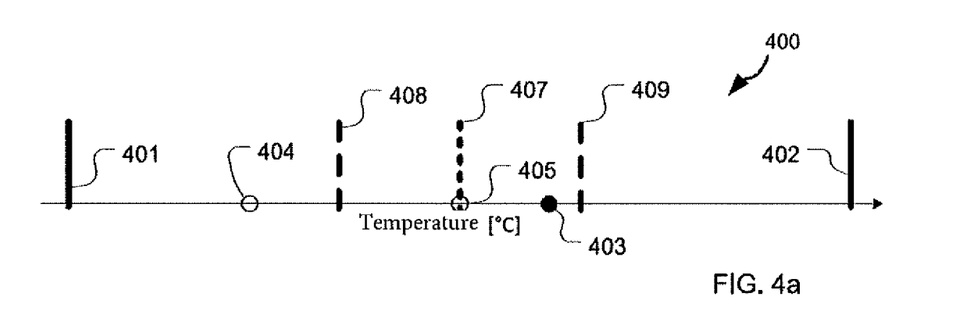
FIG. 4a is a schematic representation of an exemplary embodiment of a calculation of a measure of central tendency having threshold values arranged symmetrically around the measure of central tendency.

FIG. 4a is a schematic representation of an exemplary embodiment of a calculation of a measure of central tendency having threshold values arranged symmetrically around the measure of central tendency.

A temperature axis 400 of a temperature measurement range of a temperature sensor from a lower measurement range limit 401 to an upper measurement range limit 402 is illustrated. Three measured values 403, 404, and 405 of each of three temperature sensors are plotted on the temperature axis. Measured value 403 is marked by a solid circle, since it is the measured value of the temperature sensor whose function criterion (110 in FIG. 1) is to be determined.

In this representation, measure of central tendency 407 is the median of measured values 403, 404, and 405. Measure of central tendency 407 therefore corresponds to measured value 405. The threshold values arranged symmetrically around the measure of central tendency are represented in this case as a measure of central tendency minus lower threshold value 408 and a measure of central tendency plus upper threshold value 409 (also illustrated threshold values 408, 409) to be able to show them on the same temperature axis 400.

Measured value 403 is within the acceptance range spanned by the measure of central tendency minus lower threshold value 408 and the measure of central tendency plus upper threshold value 409, and an "okay" function criterion is thus determined.

Illustrated threshold values 408 and 409 are specific to measured value 403. The threshold values for measured value 404 may span a larger acceptance range, so that an "okay" function criterion may also be determined for the temperature sensor of measured value 404, based on the same set of measured values. The determination of the function criterion may be carried out separately for all temperature sensors of the participating measured values.

Figure 4B:
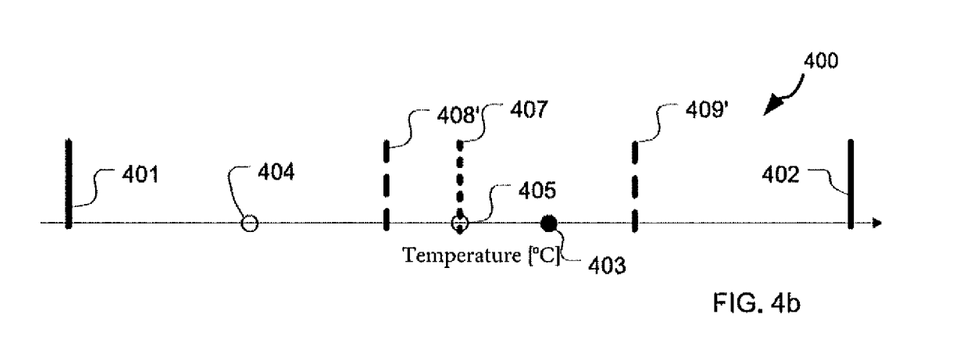
FIG. 4b is a schematic representation of an exemplary embodiment of a calculation of a measure of central tendency having threshold values arranged asymmetrically around the measure of central tendency.

FIG. 4b is a schematic representation of an exemplary embodiment of a calculation of a measure of central tendency having threshold values arranged asymmetrically around the measure of central tendency.

Temperature axis 400 of a temperature measurement range of a temperature sensor from a lower measurement range limit 401 to an upper measurement range limit 402 as well as measured values 403, 404, and 405 are identical to those in FIG. 4a. Measure of central tendency 407 is also again represented as the same median.

Only the acceptance range spanned by the measure of central tendency minus lower threshold value 408 and the measure of central tendency plus upper threshold value 409 is arranged asymmetrically around measure of central tendency 407.

An arrangement of this type is sensible for temperature sensors for which a one-sided deviation from a median value is to be expected without a malfunction being present. A deviation of this type could be based, for example, on a particular sensitivity to incident sunlight which has not yet exceeded the intensity value from the cold start conditions.

Figure 5:
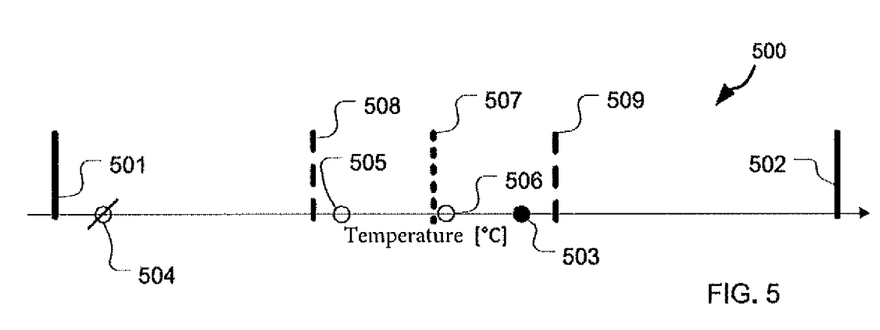
FIG. 5 is a schematic representation of an exemplary embodiment of a calculation of a measure of central tendency having threshold values arranged symmetrically around the measure of central tendency.

FIG. 5 is a schematic representation of an exemplary embodiment of a calculation of a measure of central tendency having threshold values arranged symmetrically around the measure of central tendency.

A temperature axis 500 of a temperature measurement range of a temperature sensor from a lower measurement range limit 501 to an upper measurement range limit 502 is illustrated. Four measured values 503, 504, 505, and 506 of each of four temperature sensors are plotted on the temperature axis. Measured value 503 is marked by a solid circle, since it is the measured value of the temperature sensor whose function criterion (110 in FIG. 1) is to be determined.

In this representation, measure of central tendency 507 is the arithmetic mean of measured values 503, 505, and 506. Measured value 504 was eliminated from the set of measured values, which is symbolized by the strike-through. This measured value 504 was identified as an outlier. Measure of central tendency 507 is therefore in the vicinity of measured value 506. The threshold values arranged symmetrically around the measure of central tendency are represented in this case as a measure of central tendency minus lower threshold value 508 and a measure of central tendency plus upper threshold value 509 (also illustrated threshold values 508, 509) to be able to show them on the same temperature axis 500.

Measured value 503 is within the acceptance rage spanned by the measure of central tendency minus lower threshold value 508 and the measure of central tendency plus upper threshold value 509, and an "okay" function criterion is thus determined. If measured value 503 were to be outside the acceptance range, a "not okay" function criterion would be determined.

Illustrated threshold values 508 and 509 are specific to measured value 503. The threshold values for measured value 504 may span a larger acceptance range, so that an "okay" function criterion may also be determined for the temperature sensor of measured value 504, based on the same set of measured values. This may also take place using an asymmetrical arrangement of the threshold values. The determination of the function criterion may be carried out separately for all temperature sensors of the participating measured values.

By using an arithmetic mean as measure of central tendency 507, threshold values 508 and 509 may also be arranged asymmetrically in a manner similar to FIG. 4b.

Figure 6:
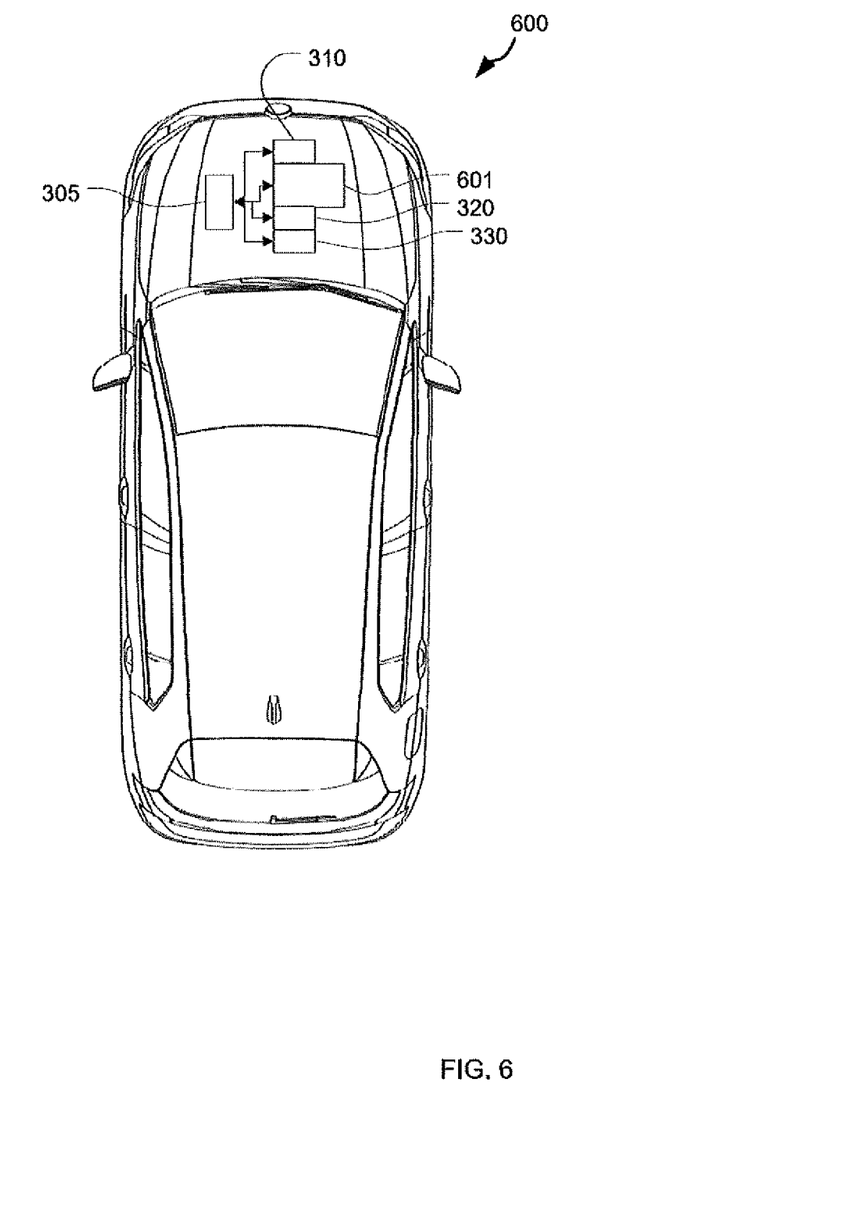
FIG. 6 is a schematic representation of an exemplary embodiment of a motor vehicle, including a prime mover designed as an internal combustion engine and a controller.

FIG. 6 is a schematic representation of an exemplary embodiment of a motor vehicle, including a prime mover designed as an internal combustion engine and a controller.

Motor vehicle 600 contains a prime mover 601 designed as an internal combustion engine and a controller 305.

Controller 305 controls or regulates prime mover 601 designed as an internal combustion engine and captures measured values of the temperature sensors from the groups air-side 320, exhaust-side 330, and in engine block and coolant circuit 320.

Temperature sensors on drive components or motors and in coolant circuits of other drive types may furthermore be included. Other drive types comprise, for example, hydrogen combustion drives, fuel cell drives, and electric drives. These may be installed individually or in combination with each other or with an internal combustion engine. The drive components may also replace or support prime mover 601 designed as an internal combustion engine.

The illustrated exemplary embodiments are to be understood as a further explanation of the present invention. A combination of the exemplary embodiments is provided. Reference is hereby made to the following claims for the exact scope of the invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method to determine a function criterion of a measuring transducer of a motor vehicle, the transducer comprising a temperature sensor, the method comprising:
    determining, by a controller of the motor vehicle, with the aid of a plurality of preconditions, whether a predefined vehicle state of the motor vehicle is present, the predefined vehicle state being a cold start and the plurality of preconditions being cold start conditions comprising at least two of a minimum time value, a detection of an engine block heater, detection of incident sunlight, and/or detection of an auxiliary heater;
    measuring, using at least three measuring transducers, which measure a same measured variable, to capture measured values, said capturing being carried out within a time period including an initialization of the controller of a prime mover, the prime mover being an internal combustion engine;
    calculating, by the controller, a measure of central tendency from the captured measured values, the central tendency comprising a trimmed mean value or a median value, wherein the central tendency minimizes an influence of an outlier from said measured values;
    calculating, by the controller, a comparison value from the captured measured values relating to the calculated measure of central tendency;
    ascertaining, by the controller, the function criterion of the measuring transducer based on a comparison of the calculated comparison value with a threshold value, the ascertained function criterion being determined if the precondition has been met and the predefined vehicle state is therefore present; and
    regulating, by the controller, the prime mover,
    wherein the threshold value is assigned to a pair of threshold values, which is arranged symmetrically upwardly and downwardly around the measure of central tendency.

2. The method according to claim 1, wherein the temperature sensors are selected from a group of air-side temperature sensors, a group of engine block and coolant temperature sensors, or a group of exhaust-side temperature sensors.

3. The method according to claim 1, wherein a time period after the start command for starting the internal combustion engine for air-side temperature sensors and for a group of engine block and a coolant temperature sensor has a time delay, which differs from a time delay of an exhaust-side temperature sensor.

4. The method according to claim 1, wherein the measure of central tendency is an arithmetic mean from the measured values of at least four temperature sensors, and wherein the measured value of the at least four temperature sensors which has the greatest deviation from the other measured values being eliminated from the arithmetic mean.

5. A controller comprising a control unit, which is configured to carry out the method according to claim 1.

6. An internal combustion engine comprising the controller according to claim 5.

7. A motor vehicle comprising the internal combustion engine according to claim 6.

8. The method according to claim 1, wherein the measured value of the at least three measuring transducers, which has a greatest deviation from the other measured values, is eliminated from the trimmed mean value or the median value.

9. The method according to claim 1, wherein the central tendency reflects an ambient temperature during the predefined vehicle state.

10. The method according to claim 1, wherein the comparison value comprises a difference of the measured value and the central tendency.

11. The method according to claim 1, wherein the temperature sensors include a group of air-side temperature sensors, a group of engine block and coolant temperature sensors and a group of exhaust-side temperature sensors.

* * * * *